United States Patent Office 3,397,963
Patented Aug. 20, 1968

3,397,963
REDUCING AGENT
Kuno Wagner, Leverkusen-Steinbuchel, Germany, assignor to Farbenfabriken Bayer Aktiengesellschaft, Leverkusen, Germany, a German corporation
No Drawing. Filed Apr. 1, 1965, Ser. No. 444,778
Claims priority, application Germany, Apr. 4, 1964, F 42,520
21 Claims. (Cl. 23—226)

This invention relates to a reducing agent consisting of a formic acid compound and a method for reducing inorganic and organic compounds.

It is known that formic acid acts as a reducing agent in the Leuckart-Wallach reaction in accordance with the following equation:

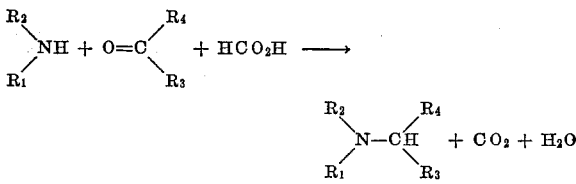

wherein $R_1$ to $R_4$ represent hydrogen atoms or hydrocarbon radicals.

Ammonia and primary and secondary amines, for example, may be readily methylated by this aminoalkylation reaction if they are heated with formaldehyde and formic acid, only slightly more than the equimolecular quantity of formaldehyde being required for each methyl group introduced. In contrast, however, it has so far not been possible to reduce aldehydes and ketones in the absence of the aforementioned reactive amines with concentrated or aqueous formic acid, or to reduce nitro compounds, nitroso compounds, azo compounds, sulphinic acids, sulphones or sulphur dioxide to sulphur, vanadic acids etc.

It has now been found that formic acid compounds as addition products of formic acid with tertiary organic amines and salts of formic acid with tertiary organic amines, optionally in the presence of metals or metal compounds, may be used as highly effective and often selectively-active reducing agents for a variety of reducible organic and inorganic compounds.

Particularly suitable for this purpose are addition compounds of formic acid with formic acid salts of tertiary organic bases and/or 1:1 salts of formic acid and tertiary organic bases. In this instance, reduction is carried out at temperatures from 40 to 180° C., preferably from 65 to 165° C., at atmospheric or elevated pressure. Catalytic quantities of cuprous salts of inorganic or organic acids and/or hydrogenation catalysts, such as palladium, platinum, rhodium, iridium or Raney nickel, can, if desired, be jointly used to accelerate reduction if it is too slow. In this instance, fresh formic acid is continuously introduced into the reaction mixture whilst carbon dioxide and smaller quantities of carbon monoxide are liberated during reduction. If reduction is carried out on these lines, the new addition compounds of formic acid, for example with formic acid salts of tertiary organic bases, act as true catalysts since freshly introduced formic acid is activated and used in the reduction in proportion as activated formic acid is consumed.

According to copending U.S. application Ser. No. 434,177, filed Feb. 18, 1965, of the inventor herein and another, these addition compounds are prepared as follows: 1 mol of the tertiary organic base is reacted as such or in the nascent state with at least 2 mols of formic acid or nascent formic acid, optionally in an inert medium; any excess formic acid and water are removed by distillation, the addition product being isolated, optionally after purification by distillation at reduced pressure. For example, the addition compound of trimethylamine and formic acid which boils constantly at 87° C./15 mm. pressure, consists of 1 molecule of trimethylamine and 3 molecules of formic acid. Not only is this addition compound an effective solvent, it is also an often selective reducing agent. The same is true as regards the new reducing agents based on triethylamine, methyl diethylamine and dimethyl ethylamine which also form addition compounds consisting of 3 molecules of formic acid and 1 molecule of tertiary base. There are, in addition, many other organic tertiary bases with molecular weights below 300 which activate formic acid in the manner referred to and whose salts with formic acid form addition compounds with formic acid. All these adducts may be employed as reducing agents. Salts of quaternary bases are subject to dealkylation, alkyl formates being eliminated. Adducts of formic acid and formic acid salts of fairly high boiling tertiary organic bases with a molecular weight in excess of 300 have a considerably higher boiling point than the abovementioned addition products of 3 molecules of formic acid and 1 molecule of trimethylamine, and decompose on distillation.

The following compounds are further examples of tertiary organic bases which may be employed as reducing agents in combination with 2 to 8 molecules of formic acid per molecule of tertiary base:

(I) Aliphatically substituted tertiary amines and polyamines, such as diethyl n-propylamine, dimethyl propylamine, dimethyl butylamine, N-methyl dibutylamine, tri-n-butylamine, dimethyl stearylamine, permethylated ethylene diamine, permethylated diethylene triamine, triethylene tetramine and permethylated aliphatic amines and polyamines containing ester groups, ether groups and nitrile groups.

(II) Aliphatic-cycloaliphatically substituted amines and polyamines such as dimethyl cyclohexylamine, diethyl cyclohexylamine, and permethylated and hydrated p-phenylene diamine.

(III) Araliphatically substituted amines, such as dimethyl benzylamine, diethyl benzylamine and di-n-propyl benzylamine.

(IV) Heterocyclic bases such as pyridine, quinoline, N-methyl morpholine, N-methyl piperidine, N,N'-dimethyl piperazine, endoethylene piperazine and bicyclic amidines of the type which may be obtained, for example, by the addition of acrylonitrile to pyrrolidone, followed by hydration and cyclisation.

It is emphasized that addition compounds of formic acid with formic acid salts of aromatic-aliphatically substituted tertiary organic bases, for example, dimethyl aniline, also contain formic acid which is sufficiently activated for reducing purposes. In most instances, however, it is not advisable to use them for the reduction of, for example, carbonyl compounds, because, in a manner similar to dimethyl aniline, the aromatic nucleus will react with the carbonyl compounds to be reduced, e.g., chloral or benzaldehyde, mainly in the p-position relative to the dimethylamino group, and diphenyl methane or triphenyl methane derivatives will be formed. These adducts may, however, readily be employed for other reductions, for example for the reduction of sulphur dioxide to elementary sulphur. Considerable advantages may even be obtained by using mixtures of the aforementioned addition compounds containing activated formic acid in reduction reactions, for example, by using binary and ternary mixtures based, for example, on addition compounds of trimethylamine, triethylamine and pyridine (1:1:1) or addition compounds of trimethylamine and N-methyl morpholine (1:0.5). These advantages are mainly a considerable increase in the solubility of the compounds to be reduced or reductively-degraded in the systems, and sometimes a suppression of secondary reactions, for example, the elimination of hydrocarbons during the reduction of chlorinated aldehydes and ketones. Acyloin condensations and resin formation may also be suppressed.

The new reducing agents according to the invention which contain activated formic acid, also include the known 1:1 salts of formic acid with any tertiary organic base or solutions of these 1:1 salts in excess tertiary amines or tertiary polyamines. These salts, for example, of pyridine and formic acid (1:1) or of dimethyl aniline and formic acid, are liquids which are already fairly viscous at 50 to 80° C. Quite unexpectedly, gaseous sulphur dioxide may be readily reduced in them at 90 to 105° C. to form elementary sulphur of outstanding filterability. Any salts of the aforementioned tertiary organic bases may be used to carry out reduction reactions of this type.

Various metal compounds may also be used in the reduction process according to the invention. These metal compounds include, in particular, cuprous chloride and even cupric salts which may be rapidly reduced into cuprous formates, in which case reduction to very finely-divided metallic copper takes place after a short time in highly active systems, for example trimethylamine and formic acid. It is important that, in this phase, too, the addition should retain its catalytic activity. Of equal importance are the noble metal catalysts such as palladium, palladium oxide, palladium on activated carbon, platinum, rhodium and iridium, and the conventional hydrogenation catalysts such as Raney nickel. The effect on catalysis of the decomposition of activated formic acid by the addition of metals and metal salts is illustrated by the addition of cuprous chloride in the trimethylamine/formic acid system. Whereas, for example, the activated formic acid in the addition compound of 1 molecule of trimethylamine and 3 molecules of formic acid decomposes very rapidly and almost quantitatively into carbon monoxide and water at 140° to 170° C. in the absence of hydrogenatable compounds, the addition of the copper salt as a catalyst very effectively counteracts the formation of carbon monoxide and water, so that the activated formic acid is decomposed into hydrogen and $CO_2$ at temperatures as low as 125 to 145° C. Similar effects are obtained with palladium, platinum and known hydrogenation catalysts, so that the hydrogen which is formed from the activated formic acid is sufficiently activated for the hydrogenation of various classes of compounds to be mentioned hereinafter. Metals, such as mercury, magnesium, aluminium, thallium, tin, lead, iron, cobalt and nickel and their inorganic or organic salts, are also of interest.

There is no need to add any of the aforementioned metal salts as catalysts to the reducing agents according to the invention, for example, in the reduction of any carbonyl compounds in which the carbonyl group is highly polarised carbonyl, for example, by $\alpha$-halogen substitution, e.g., in chloral, because, in such instances, reduction is very rapidly initiated and is apparently not limited to the occurrence of elementary hydrogen. In this case, trichloroethyl alcohol is obtained in a high yield without secondary reactions, such as the elimination of chloroform. Similarly, sulphur dioxide may be readily reduced by the reducing agents according to the invention, giving crystalline elementary sulphur without any catalysts being present.

To carry out the reduction process, the compounds to be reduced are dissolved in the addition compounds containing active formic acid, or in salts of formic acid, optionally with the aid of solvents, for example 1,4-dioxane, dimethyl formamide and formamide. Heating to 80 to 145° C. initiates reduction, and the amount of $CO_2$ liberated, as measured, for example, with a gas meter, is an indication of the progress of reduction. Reduction may be carried out under atmospheric pressure, or at elevated pressure. If reduction proceeds at too slow a rate, it may be accelerated by the addition af the aforementioned metal catalysts or hydrogenation catalysts. Gases which are to be reduced, for example $SO_2$, may even be introduced into the reducing agent in diluted form at 80 to 105° C., so that they are reduced. Reduction may be carried out without an excess of formic acid, but it is generally advisable to work under acidic conditions in which case 0.5 to 5 mols. of concentrated formic acid are used per mol. of reducing agent. In a number of instances, excess formic acid may be used as an entraining agent for the water formed during the reaction, or for volatile compounds which have already been reduced and which may be continually distilled off during reduction. It is preferred continuously to add fresh formic acid to the reaction mixtures in proportion as carbon dioxide is evolved and as formic acid is distilled off. For this purpose, the fresh formic acid may even be replaced by a compound forming nascent formic acid (e.g., oxalic acid) or by formic acid which is formed by the reaction of carbon monoxide and water at high pressure, or by hydrolysis of, for example, formamide or esters of formic acid.

The reduction process may even be carried out by allowing the active reducing agents to act on the compounds to be reduced in the nascent state. This would happen, for example, when the compounds to be reduced are dissolved or suspended in formic acid, in which case no reduction occurs, and it is only on adding tertiary amines at the requisite temperature of the reaction mixture in such a quantity that 1:1-salts, 1:2-salts and addition compounds of formic acid with three or more molecules of formic acid, are formed or even solutions of the salts in excess quantities of tertiary amines are formed. It would even be possible to allow tertiary amines to be formed during reduction by adding primary or secondary amines together with formaldehyde or carbonyl compounds and excess formic acid, and allowing the aforementioned addition compounds of 3 moles of formic acid and 1 molecule of tertiary base to be formed by known aminoalkylation reactions. It would of course even be possible to employ either the crude solutions of any tertiary bases which may be obtained by Leukhart-Wallach aminomethylation reactions, such as formic acid salts or solutions of these salts in excess formic acid.

Examples of compounds which may be reduced with considerable technical advance are halogen-substituted aldehydes, for example chloral. In this case, it is an advantage that chloral hydrate or chloral alcoholate may be reduced as successfully as anhydrous chloral. Butyrochloral hydrate, too, may be readily reduced without any need for the addition of activating metal catalysts: the same applies as regards formaldehyde, paraformaldehyde or fairly high molecular weight polyoxymethylenes, in which case readily volatile methyl formate (B.P. 32° C.) is formed. In addition, aromatic aldehydes such as p-nitrobenzaldehyde terephthal dialdehyde, benzaldehyde, 1,4-benzoquinone and chloranil, may fairly readily be reduced, but these compounds are converted by reduction into products whose constitution is still unknown. Cinnamaldehyde is preferably reduced in the presence of catalytic quantities of cuprous chloride and palladium on activated carbon, forming $\beta$-methyl styrene which in turn gives rise to the partial formation, by re-arrangement, of allyl benzene and also the formic acid esters of cinnamic alcohol and of dihydrocinnamic alcohol. In the case of chloranil, all four chlorine atoms are eliminated, forming powdery, deep-coloured compounds whose constitution is still unknown. The reduction of a variety of ketones, for example in the addition products of trimethylamine and formic acid is practically unable to take place in the absence of additional metal catalysts, whilst in the presence of catalytic quantities of cuprous chloride and palladium, reduction takes place very readily, formic acid esters of secondary alcohols being obtained as the end products. The same applies as regards the reduction of furfural, polyaldehydes, polyketones, crotonaldehyde and polyene aldehydes, although it is not yet clear in the latter instance whether reduction is strictly selective and whether all the double bonds remain intact. The reduction of aliphatic or aromatic nitro compounds in the presence of catalytic quantities of hydrogenation catalysts results in the formation in high yields of the N-formyl derivatives of the amines. C- and N-nitroso compounds are very readily reduced. It is an advantage that, for example, the preparation and reduction of the nitroso compounds, for example N-nitroso diphenyl amine, and their rearrangement, may be carried out in one system without change of solvent, merely by controlling the temperature.

The process according to the invention, however, is not only suitable for the reduction of carbonyl compounds, but also their derivatives such as hydrazones, oximes, semicarbazides, thiosemicarbazides, azine and nitro and nitroso compounds. A very large number of organic compounds undergo fundamental conversion by reduction in the reducing agents according to the invention, but an explanation of this still has to be found. The following are examples of such compounds: adducts of chloral with urea and thiourea; adducts of chloral with formamide, urethanes, acid amides and melamine; and chalkone.

Examples of reactions according to the invention include the conversion of formamidine sulphinic acid, xanthic acids, dithiocarbamic acids and their salts; the dissociation of cyclic sulphurous acid esters; the reduction of sulphinic acids into formylated mercaptans; the conversion of dehydro acetic acid; the conversion of malonic acid esters and acetoacetic acid esters; the conversion of citric acid, uric acid and barbiturates or 3,5-dioxopyrazolidines unsubstituted in the 4-position isatin, indoxyl, indigo and thioindigo; modifications of polyethylene sulphones and polybutadiene sulphones; the dissociation of gelatin and polypeptides, such as casein; the dissociation of azo compounds; the conversion of cyclopentadiene and polycyclopentadiene, hexachlorocyclopentadiene and trans-1,4-dichlorobutene; the degradation of polyacrylonitrile; the conversion of methylol compounds of nitromethane and of dimethylol nitromethane; and conversion of polymethylene thioureas and polymethylene ureas, of N-methylol ethers and acid amides, ureas and urethanes and of lactam ethers; the conversion of addition products of chloral and phosphoric acid esters, for example dimethyl phosphite; the conversion of cyanuric chloride; the stabilisation of high molecular weight polyoxymethylenes, for example copolymers of trioxane with small quantities of ethylene oxide, dioxolan, oxthiolan and other cyclic ethers, thioethers and acetals or mercaptals and vinyl compounds; the degradation of starch, cellulose, saccharose, glucose and other sugars; and the degradation of polymers of acrolein and furfural, and polymerisation products of chloral.

As already mentioned, the reducing agents according to the invention are also eminently suitable for the reduction of inorganic compounds or ions. For example, it has already been mentioned that, quite unexpectedly, sulphur dioxide may be readily reduced into elementary sulphur, even by those simple salts of tertiary organic bases with formic acid which are often liquid at temperatures above 50 to 70° C., and are also effective solvents for a number of compounds. Nitrous acid, and nitrite salts and esters may be very readily reduced and, if reduction is energetic, the formylated hydroxylamine or $NH_3$ stage is reached. However, unstable and explosively-decomposing intermediates may also be isolated in the reduction of sodium nitrite. They are assumed to have the constitution of a nitrosyl formate or bisformyl derivative of hydroxylamine. The very easy reduction of noble metal salts, such as silver nitrate, is no more surprising because this salt is actually reduced by formic acid alone, but at a much slower rate. In addition, cupric salts are very readily reduced, via the cuprous stage, to metallic copper, for example, in the trimethyl amine/formic acid system. Similarly, the metal ions in a variety of compounds of vanadium, arsenic, manganese, lead, chromium, bismuth and selenium, are reduced to lower valency stages. One advantage of the reduction process according to the invention in the reduction of organic metal compounds, is that the new reducing agents are effective solvents for a number of metal salts, and that they may be readily converted into formates of mono- or bi-valent metals. In addition, a variety of highly active mixed catalysts may advantageously be prepared in finely-divided form by this method. Further, it is even possible to retain desired valency states during reduction, by means of complex formation, for example with acetyl acetone or acetonyl acetone, and to isolate the resulting complexes by distilling off the reducing agents. These metal complexes or metal formates and their mixtures are, for example, active polymerisation accelerators and catalysts in the diisocyanate polyaddition process, catalysts for carbonylation reactions, hydrogenation reactions and dehydrogenation reactions. The high activity of the reduction systems also enables nitrous gases to be purified and, in particular, waste gases containing $SO_2$ before discharge into the atmosphere; in the latter instance finely powdered, crystalline elementary sulphur of outstanding filterability is obtained. It is an important advantage in this connection that the water formed during the reduction of $SO_2$ does not harm the catalysts, and that dilute aqueous solutions retain their activity as reducing agents.

It has been found that the reduction process according to the invention may be used for a number of purposes. The process may be used for the reduction of a number of organic and inorganic compounds, for example, in the production of dyes, pharmaceutical products and their intermediates, for bleaching purposes, for reducing purposes in dyeing and printing, for etching, for bleaching natural and synthetic fibres, for swelling and dissolving high molecular weight materials and, in some instances, for the degradation by reduction of these high molecular weight compounds. In comparison with other reduction processes with formic acid, for example the process in which the compounds to be reduced are exposed to the simultaneous action of formic acid and sulphurous acid, the reduction process according to the invention is substantially more flexible and is distinguished by the formic acid having a much more intense reducing effect.

EXAMPLE 1

788 parts by weight of the liquid addition product of 3 molecules of formic acid and 1 molecule of trimethylamine (B.P. 87° C./15 mm.) are placed in a 3-necked flask which is provided with a thermometer, stirrer, dropping funnel and reflux condenser connected to a gas meter. 827 parts by weight of chloral hydrate are dissolved in the liquid addition product while stirring at 70° C. The internal temperature of the reaction mixture is raised by increasing the external temperature to 130 to 140° C. until vigorous reflux begins. If, after 25 minutes, there has been no vigorous evolution of $CO_2$, 25 cc. of concentrated formic acid are added to the mixture, the evolution of $CO_2$ will then begin immediately. Fresh concentrated formic acid is added dropwise to the reaction mixture in an amount proportional to the amount of gas evolved shown by the gas meter. The gas evolved is mainly $CO_2$, with only small quantiies of CO. In the initial stages of reduction, about 1 litre of $CO_2$ is liberated per minute. After 1 hour, about 40 litres of $CO_2$ have been liberated, whilst after 2 hours as much as 64 litres of $CO_2$ have been liberated. After another 4 hours, about 95 litres of gas have escaped and the rate at which the gas is evolved has been reduced by about $\frac{1}{10}$ at an internal temperature ranging from 105 to 110° C. From this moment on, the formation of carbon monoxide increases. The trichloroethanol which is formed is distilled off as reduction progresses. For this purpose, the reflux condenser is replaced by a 30 cm. long column and a 2-phase mixture is distilled off at reduced pressure (300 to 400 mm.). The lower phase is trichloroethanol containing 23% by weight of formic acid, whilst the upper phase is water with 15 to 21% by weight of formic acid and small quantities of dissolved trichloroethyl alcohol. The separated aqueous phases are continuously returned to the reduction mixture, so that the water and formic acid are used as entraining agents for trichloroethanol. Distillation is continued until there is no further division between the phases in the distillate. Distillation is then completed in a water jet vacuum until no more trichloroethyl alcohol can be detected in the distillate. A total of 825 parts by weight of trichloroethanol containing 23% by weight of formic acid is obtained. The yield of crude trichloroethanol comprises 635 parts by weight, corresponding to 86% of the theoretical. The crude trichloroethanol is purified by hydrolysis and distillation with dilute aqueous sulphuric acid to remove small amounts of trimethylamine salts and small amounts of trichloroethyl formate. The pure trichloroethanol which does not contain any formic acid boils at 57 to 58° C./15 mm. pressure.

EXAMPLE 2

The procedure is exactly the same as in Example 1, except that a formic acid/pyridine adduct is used as the reduction medium. The reduction mixture is prepared by slowly introducing 474 parts by weight of pyridine into 460 parts by weight of formic acid, and adding 825 parts by weight of chloral hydrate to the reaction mixture. The clear solution is reduced at 105 to 106° C. as in Example 1, and worked up. 982 parts by weight of crude trichloroethanol are obtained containing about 20% by weight of pyridine. Trichoroethanol is obtained in an 85% yield by purification as in Example 1. The yield of trichloroethanol may be increased to 95% of the theoretical if all the distillates are worked up.

EXAMPLE 3

As in Example 1, 800 parts by weight of the addition product of 3 molecules of formic acid and 1 molecule of triethylamine (B.P. 97° C./18 mm.) are used to reduce 900 parts by weight of chloral alcoholate. Before reduction begins, 300 parts by weight of formic acid are introduced and any ethyl formate which is formed is removed by way of a column during the initial, moderate stages of reduction. Reduction is then carried out as described in Example 1 by adding more formic acid, as a result of which $CO_2$ is eliminated at about the same rate as in Example 1. After working up and purifying the distillates in accordance with Examples 1 and 2, 82% of the theoretical yield of trichloroethanol are obtained, B.P. 57–58° C./15 mm.

EXAMPLE 4

30 parts by weight of a finely powdered polyoxymethylene with an average molecular weight of about 6000 are dissolved and depolymerised at 110 to 120° C. in 300 parts by weight of the addition product of 1 molecule of trimethylamine and 3 molecules of formic acid. Reduction commences immediately, and is accompanied by a vigorous evolution of $CO_2$. As in Example 1, fresh formic acid is continuously introduced. The escaping $CO_2$ and methyl formate vapours are passed through several cold traps, as a result of which the methyl formate which boils at 31 to 32° C. is separated by condensation at −20° C. After 15 litres of $CO_2$ have been evolved, another 30 parts by weight of polyoxymethylene are added to the reaction mixture and any water which has formed, together with formic acid, is removed by distillation, methyl formate being removed from the escaping $CO_2$ by condensation as already described. The complete removal of the methyl formate from the escaping gases by condensation is difficult. 80 parts by weight of methyl formate, B.P. 31–32° C. are obtained.

EXAMPLE 5

The stabilisation, by reduction, of high molecular weight polyoxymethylenes.

100 parts by weight of each of 2 high molecular weight polyoxymethylenes (A and B) obtained by the copolymerisation of (a) 98 parts by weight of trioxane and 2 parts by weight of 1,3-dioxolan (polyoxymethylene A) or (b) 98 parts by weight of trioxane and 2 parts by weight of oxthiolan (polyoxymethylene B), with boron trifluoride etherate as the catalyst, are heated at 115 to 120° C. in 400 parts by weight of a mixture of pyridine and formic acid (2:1). The reductive degradation by reduction commences immediately and, in addition to $CO_2$, methyl formate also escapes. After 3 hours, the batches are filtered, washed with acetone, water and again with acetone and then dried. There are obtained 68 parts by weight of a high molecular weight polyoxymethylene (polyoxymethylene (a)) which has a decomposition rate of 0.18% of formaldehyde per minute at 222° C., and 71 parts by weight of a high molecular weight, thermostable polyoxymethylene (polyoxymethylene (b)) decomposing at a rate of 0.06% per minute.

EXAMPLE 6

31 parts by weight of p-nitrobenzaldehyde are reduced with 20 parts by weight of concentrated formic acid at 130 to 140° C. in 96 parts by weight of the addition product of 1 molecule of trimethylamine and 3 molecules of formic acid. After 8 hours, the reduction mixture is diluted with water. The resulting oily layer which contains p-nitrobenzyl formate, is hydrolysed with potassium carbonate solution. The resulting viscous oil crystallises very slowly. 15 parts by weight of p-nitrobenzyl alcohol, M.P. 93° C., and 8 parts by weight of a fairly high molecular weight condensate which contains nitro groups and whose constitution is unknown are obtained.

EXAMPLE 7

25 parts by weight of chloranil (test (a)) and 33 parts by weight of 1,4-benzoquinone (test (b)) are separately reduced at 115 to 136° C., with stirring, in 190 parts by weight of the addition product of 1 molecule of trimethylamine and 3 molecules of formic acid. At the same time, water and formic acid are distilled off, while fresh formic acid is continuously introduced. Both the elimination of $CO_2$ and reduction commence immediately, noticeably faster in the case of chloranil than in the case of benzoquinone. After reduction for 10 hours, the batches are mixed with water and filtered. Test (a): yield 9 parts by weight: test (b): yield 12 parts by weight. Deep black-coloured powdery products which decompose on melting and which are soluble in dimethyl formamide, are obtained. The reduction product obtained from chloranil is practically free of chlorine and is a deep black dye.

EXAMPLE 8

This example illustrates the influence upon the reduction of additions of cuprous chloride and palladium on activated carbon.

Whereas cinnamaldehyde can only be reduced at high temperatures, for example at 150 to 160° C. and then only very slowly, by the addition products of trimethylamine and formic acid (1:3), a large amount of carbon monoxide being unfavorably eliminated at these temperatures on account of the decomposition of the reducing agent, cinnamaldehyde may be very readily, but not uniformly, reduced in the presence of cuprous chloride and palladium.

A mixture of 197 parts by weight of the addition product of 3 molecules of formic acid and 1 molecule of trimethylamine, 138 parts by weight of concentrated formic acid and 132 parts by weight of cinnamaldehyde, is mixed while stirring in a nitrogen atmosphere with 2 parts by weight of cuprous chloride and 6 parts by weight of 5% by weight palladium on activated carbon. Reduction begins very rapidly at 138 to 145° C. and fresh formic acid is continuously added dropwise to the reaction mixture. The escaping gases contain large amounts of $CO_2$, a little hydrogen and carbon monoxide. Reduction is continued until the gas meter shows a reading of 82 litres. The reaction mixture is then filtered to remove the catalyst, and distillation is completed at 200 mm. pressure until the distillate separates into two layers. Formic acid is then removed from the upper layer (60 parts by weight) by boiling for two hours with powdered potassium carbonate. The upper layer is a mixture of β-methyl styrene, B.P. 76 to 78° C./19 mm. pressure, and allyl benzene, B.P. 156 to 157° C./760 mm. The allyl benzene is formed by the rearrangement of the β-methyl styrene during boiling with potassium carbonate. After separating the β-methyl styrene, the reduction mixture is further distilled at a pressure of 15 mm. Formic acid and, finally, the addition product of 1 molecule of trimethylamine and 3 molecules of formic acid, B.P. 87° C./15 mm., are removed. The residual viscous oil, approximately 80 parts by weight, contains only traces of cinnamaldehyde and is a mixture of the formic acid ester of cinnamic alcohol, B.P. 138° C./23 mm, dihydrocinnamic alcohol and other products.

EXAMPLE 9

Aliphatic and aromatic nitro and polynitro compounds are slowly reduced in the formic acid addition products without the addition of metal catalysts, cf. the selective reduction of p-nitrobenzaldehyde in Example 6. Reduction proceeds very rapidly in the presence of palladium or platinum and cuprous chloride, and the N-formyl compounds of the resulting amines or polyamines are obtained in a high yield.

62 parts by weight of nitrobenzene, 197 parts by weight of the addition product of 3 molecules of formic acid and 1 molecule of trimethylamine, 138 parts by weight of formic acid, 2 parts by weight of cuprous chloride and 6 parts by weight of 5% by weight palladium on activated carbon are reduced at 130° C. Reduction is continued until the gas meter shows a reading of 114 litres, whereafter the water, together with the formic acid, is removed as fresh formic acid is continuously introduced during the distillation. The trimethylamine/formic acid addition product is then distilled off, and 55 parts by weight of pure formanilide, B.P. 163° C./18 mm., are obtained by distillation in a water jet vacuum.

EXAMPLE 10

47 parts by weight of butadiene sulphone, 46 parts by weight of formic acid and 197 parts by weight of the addition product of 3 molecules of formic acid and 1 molecule of trimethylamine are reduced as described in Example 1. Reduction begins rapidly at 120° C. In addition to $CO_2$, butadiene also escapes. A rubber-like dark-coloured thermoplastic substance precipitates after a short time; it is very sparingly soluble and elementary sulphur may be extracted from it. Yield, 15 parts by weight. A similar batch prepared with polyethylene sulphone which, although insoluble, is about 0.8% soluble in the reducing agent, shows that in this instance, too, reduction begins very rapidly, resulting in the formation of polymers with unknown constitution and a high sulphur content.

EXAMPLE 11

The following experiment, in which a number of reducing agents are used in short-period tests, shows that formic acid is already activated by simple salt formation but very highly activated by the formation of adducts between additional formic acid molecules and formic acid salts, that even sulphur dioxide may readily be reduced to elementary sulphur.

Comparison test A: No elementary sulphur is obtained by the prolonged introduction of sulphur dioxide into boiling formic acid.

Test B: If, on the other hand, $SO_2$ is introduced at 95 to 108° C. into each of the liquid mixtures or liquid addition compounds listed in the table below, sulphur is rapidly precipitated in the form of small, very fine crystals which may very easily be filtered off. It is even possible by using the very weak base, pyridine, to obtain an almost quantitative reduction into elementary sulphur, in which case even fairly large quantities of water do not harm the catalyst activity, cf. test C.

TABLE

| Base | Mol | | Rate at which S is precipitated |
| --- | --- | --- | --- |
| | Base | Acid | |
| Trimethylamine | 1 | 2,3,4,5,6 | Very rapid. |
| Triethylamine | 1 | 2,3,4,5,6 | Rapid. |
| Dimethylcyclohexylamine | 1 | 1,2,3,4 | Do. |
| Dimethylbenzylamine | 1 | 0.5; 1,2,3 | Do. |
| Pyridine | 1 | 0.3; 0.5-3 | Very rapid. |
| N-methylmorpholine | 1 | 2,3 | Do. |
| Endoethylene piperazine | 1 | 3,4,5,6 | Do. |
| Permethylated ethylene diamine | 1 | 3-8 | Rapid. |
| Bicyclic amidine | 1 | 2-6 | Very rapid. |

```
CH₂————CH
    |      |
    |     C════N
    |    /      \
CH₂—N          CH₂
    \          /
     CH₂——CH₂
```

Test C: Sulphur dioxide is slowly introduced at 100° C. into a mixture of 158 parts by weight of pyridine, 276 parts by weight of formic acid and 600 parts by weight of water. $CO_2$ is immediately evolved, and crystalline sulphur is very rapidly precipitated. A total of 320 parts by weight of sulphur dioxide is introduced and spent formic acid is continuously replenished. Small quantities of sulphur dioxide escape because the residence time in the reduction medium is short. Sulphur which may be readily filtered off is obtained in an almost quantitative yield of 148 parts by weight.

EXAMPLE 12

As described in Example 1, 6 parts by weight of cuprous chloride, 4 parts by weight of cupric sulphate, 1 part by weight of manganese oxide, 0.5 part by weight of lead dioxide, 0.5 part by weight of chromic acid, 0.6 part by weight of ammonium vanadate and 0.8 part by weight of ferric chloride are reduced at 120 to 130° C. in 197 parts by weight of the liquid addition product of 1 molecule of trimethylamine and 3 molecules of formic acid and 90 parts by weight of concentrated formic acid. There is a vigorous evolution of both $CO_2$ and hydrogen after a short time. After 4 hours, the reduction mixture is evaporated to dryness in vacuo and the mixed catalyst is isolated. It is a mixture of elementary, very finely divided copper uniformly mixed with the formates of bivalent manganese and lead, trivalent vanadium, trivalent chromium and bivalent iron. When used in quantities of 0.02% by weight, the mixed catalyst accelerates addition, polyaddition and polymerisation reactions of mono- and polyisocyanates.

I claim:

1. Reducing agent consisting of a formic acid compound selected from the group consisting of addition products of formic acid with tertiary organic amines, wherein the reducing agent is combined with an additionally activating metal component.

2. Reducing agent according to claim 1, wherein the additionally activating metal component is a member selected from the group consisting of copper-I-halide and copper-II-halide.

3. Reducing agent according to claim 1, wherein the additionally activating metal component is a noble metal selected from the group consisting of palladium, platinum, rhodium and iridium.

4. Reducing agent according to claim 1, wherein the additionally activating metal component is a hydrogenation catalyst.

5. Reducing agent according to claim 4 wherein said hydrogenation catalyst is Raney nickel.

6. Reducing agent consisting of an addition product of ternary mixtures of trimethyl amine, triethyl amine and pyridine with formic acid.

7. Reducing agent consisting of an addition product of 1 molecule of trimethyl amine, 1 molecule of triethyl amine, 1 molecule of pyridine and 1 molecule of formic acid.

8. Method for reducing inorganic and organic compounds which comprises contacting at a temperature between about 40–180° C. and a pressure at least as high as atmospheric pressure such a compound with a reducing agent in the form of a formic acid compound selected from the group consisting of addition products of formic acid with tertiary organic amines and salts of formic acid with tertiary organic amines.

9. Method for reducing reducible inorganic and organic compounds which comprises contacting at a temperature between about 40–180° C. and a pressure at least as high as atmospheric pressure such a compound with a reducing agent in the form of a formic acid compound selected from the group consisting of addition products of formic acid with tertiary organic amines and salts of formic acid with tertiary organic amines, wherein the reducing agent is combined with an additionally activating metal component.

10. Method according to claim 8 wherein the reducing agent is combined with an additionally activating metal component which is a member selected from the group consisting of copper-I-halide and copper-II-halide.

11. Method according to claim 8 wherein the reducing agent is combined with an additionally activating metal component which is a member selected from the group consisting of palladium, platinum, rhodium and iridium.

12. Method according to claim 8 wherein the reducing agent is combined with an additionally activating metal component which is a hydrogenation catalyst.

13. Method according to claim 12 wherein said hydrogenation catalyst is Raney nickel.

14. Method according to claim 8 wherein the organic compound which is reduced is a carbonyl compound.

15. Method according to claim 9 wherein the organic compound which is reduced is a carbonyl compound.

16. Method according to claim 14 wherein the carbonyl compound is a member selected from the group consisting of aldehydes and ketones.

17. Method according to claim 16 wherein the carbonyl compound which is reduced is the aldehyde chloral.

18. Method according to claim 16 wherein the carbonyl compound which is reduced is the aldehyde chloral-hydrate.

19. Method according to claim 16 wherein the carbonyl compound which is reduced is the aldehyde chloral-alcoholate.

20. Method according to claim 8 wherein the inorganic compound which is reduced is gaseous sulfur dioxide.

21. Method according to claim 9 wherein the inorganic compound which is reduced is gaseous sulfur dioxide.

References Cited

UNITED STATES PATENTS

| | | | |
|---|---|---|---|
| 1,931,204 | 10/1933 | Meerwein et al. | 260—633 |
| 1,625,924 | 4/1927 | Woodruff et al. | 252—441 |
| 2,126,455 | 8/1938 | Dettwyler | 23—97 |
| 2,602,757 | 7/1952 | Kantrowitz et al. | 252—188 X |
| 2,657,119 | 10/1953 | Patton | 23—226 |

OTHER REFERENCES

Karrer, Organic Chemistry, 2nd English edit. (1946), pgs. 151, 165, 188 and 421 relied on.

OSCAR R. VERTIZ, *Primary Examiner.*

A. GREIF, *Assistant Examiner.*